(12) United States Patent
Tan et al.

(10) Patent No.: US 11,992,945 B2
(45) Date of Patent: May 28, 2024

(54) SYSTEM AND METHODS FOR TRAINING ROBOT POLICIES IN THE REAL WORLD

(71) Applicant: Google LLC, Mountain View, CA (US)

(72) Inventors: Jie Tan, Mountain View, CA (US); Sehoon Ha, Atlanta, GA (US); Peng Xu, Santa Clara, CA (US); Sergey Levine, Berkeley, CA (US); Zhenyu Tan, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 284 days.

(21) Appl. No.: 17/094,521

(22) Filed: Nov. 10, 2020

(65) Prior Publication Data

US 2022/0143819 A1 May 12, 2022

(51) Int. Cl.
*B25J 9/16* (2006.01)
*B25J 13/08* (2006.01)
*G05D 1/00* (2006.01)
*G06N 3/08* (2023.01)

(52) U.S. Cl.
CPC .......... *B25J 9/163* (2013.01); *B25J 9/162* (2013.01); *B25J 9/1689* (2013.01); *B25J 13/089* (2013.01); *G05D 1/02* (2013.01); *G06N 3/08* (2013.01)

(58) Field of Classification Search
CPC . B25J 9/163; B25J 9/162; B25J 9/1689; B25J 13/089; G05D 1/02; G06N 3/08; G06N 3/006; G06N 3/0454; G06N 7/005
See application file for complete search history.

(56) References Cited

U.S. PATENT DOCUMENTS

| | | | | |
|---|---|---|---|---|
| 10,981,272 | B1* | 4/2021 | Nagarajan | B25J 9/1669 |
| 11,188,821 | B1* | 11/2021 | Kalakrishnan | B25J 9/1664 |
| 2011/0015785 | A1* | 1/2011 | Tsusaka | G05B 19/42 |
| | | | | 700/254 |
| 2013/0218342 | A1* | 8/2013 | Teng | G05D 1/0231 |
| | | | | 901/1 |
| 2017/0368686 | A1* | 12/2017 | Lin | B25J 9/1676 |
| 2018/0157973 | A1* | 6/2018 | El-Yaniv | G06N 3/0454 |
| 2019/0232488 | A1* | 8/2019 | Levine | B25J 9/1664 |
| 2019/0385022 | A1* | 12/2019 | Jang | G06K 9/6256 |
| 2020/0061839 | A1* | 2/2020 | Deyle | G06Q 10/087 |
| 2020/0086483 | A1* | 3/2020 | Li | B25J 9/1653 |

(Continued)

OTHER PUBLICATIONS

Kalashnikov, Dmitry, et al. "QT-Opt: Scalable Deep Reinforcement Learning for Vision-Based Robotic Manipulation." arXiv:1806.10293v3 [cs.LG] Nov. 28, 2018; 23 pages.

(Continued)

*Primary Examiner* — Sohana Tanju Khayer
(74) *Attorney, Agent, or Firm* — Gray Ice Higdon

(57) ABSTRACT

Techniques are disclosed that enable training a plurality of policy networks, each policy network corresponding to a disparate robotic training task, using a mobile robot in a real world workspace. Various implementations include selecting a training task based on comparing a pose of the mobile robot to at least one parameter of a real world training workspace. For example, the training task can be selected based on the position of a landmark, within the workspace, relative to the pose. For instance, the training task can be selected such that the selected training task moves the mobile robot towards the landmark.

17 Claims, 6 Drawing Sheets

(56) References Cited

U.S. PATENT DOCUMENTS

| | | | |
|---|---|---|---|
| 2021/0103255 A1* | 4/2021 | Jha | G05B 13/047 |
| 2021/0150892 A1* | 5/2021 | Xu | G05B 13/027 |
| 2021/0187737 A1* | 6/2021 | Fujimoto | B25J 9/1661 |
| 2021/0229273 A1* | 7/2021 | Kanai | B25J 9/162 |
| 2021/0356960 A1* | 11/2021 | Takai | G05D 1/0276 |
| 2021/0387330 A1* | 12/2021 | Mavrin | B25J 9/163 |
| 2022/0019866 A1* | 1/2022 | Haarnoja | G06N 3/084 |
| 2022/0066401 A1* | 3/2022 | Baehring | B25J 9/161 |
| 2022/0083012 A1* | 3/2022 | Luo | G06N 20/00 |

OTHER PUBLICATIONS

Heess, N. et al., "Emergence Of Locomotion Behaviours In Rich Environments;" Cornell University, arXiv.org, arXiv:1707.02286v2; 14 pages; Jul. 10, 2017.

Levine, S. et al. "End-to-End Training of Deep Visuomotor Policies;" Journal of Machine Learning Research, 17; 40 pages; Apr. 2016.

Kohl, N. et al., "Policy Gradient Reinforcement Learning For Fast Quadrupedal Locomotion;" Proceedings of the IEEE International Conference on Robotics and Automation, pp. 2619-2624; May 2004.

Button, R. S., et al.; Reinforcement Learning: An Introduction; MIT Press; 10 Pages; US; dated 1998.

Kenneally, G., et al. "Design Principles For A Family Of Direct-Drive Legged Robots;" IEEE Robotics and Automation Letters, vol. 1, No. 2; 8 pages; Jul. 2016.

Coumans, E., et al.; Pybullet, aPython Module for Physics Simulation, Games, Robotics and Machine Learning; http://pybullet.org/; dated 2016.

Schulman, J. et al., "Proximal Policy Optimization Algorithms;" Cornell University, arXiv.org, arXiv:1707.06347v2; 12 pages; Aug. 28, 2017.

Fujimoto, S. et al., "Addressing Function Approximation Error In Actor-Critic Methods;" In International Conference on Machine Learning (ICML); 10 pages; 2018.

Haamoja, T. et al., "Learning To Walk Via Deep Reinforcement Learning;" Cornell University, arXiv.org, arXiv:1812.11103v1; 8 pages; Dec. 26, 2018.

Bledt, G. et al., "MIT Cheetah 3: Design and Control of a Robust, Dynamic Quadruped Robot;" In International Conference on Intelligent Robots and Systems (IROS); 8 pages; 2018.

Park, HW et al., "High-speed bounding with the MIT Cheetah 2: Control design and experiments;" The International Journal of Robotics Research, vol. 36(2); pp. 167-192; 2017.

Katz, B. et al., "Mini Cheetah: A Platform for Pushing the Limits of Dynamic Quadruped Control;" In International Conference on Robotics and Automation (ICRA); IEEE; 7 pages; May 2019.

Hutter, M. et al., "ANYmal—A Highly Mobile and Dynamic Quadrupedal Robot;" In International Conference on Intelligent Robots and Systems (IROS); 7 pages; IEEE, 2016.

Tsounis, V. et al., "DeepGait: Planning and Control of Quadrupedal Gaits using Deep Reinforcement Learning;" Cornell University, arXiv.org, arxiv:1909.08399v1; 8 pages; Sep. 18, 2019.

Apgar, et al., "Fast Online Trajectory Optimization for the Bipedal Robot Cassie;" In Robotics: Science and Systems; 8 pages; 2018.

Kim, D. et al., "Stabilizing Series-Elastic Point-Foot Bipeds Using Whole-Body Operational Space Control;" IEEE Transactions on Robotics, vol. 32, No. 6; 18 pages; Dec. 2016.

Cully, A. et al., "Robots That Can Adapt Like Animals;" Nature 521; 26 pages; 2015.

Chatzilygeroudis, K., et al. "Reset-Free Trial-and-Error Learning for Robot Damage Recovery;" Robotics and Autonomous Systems, 100; pp. 236-250; Feb. 2018.

Amini, A. et al., "Variational End-to-End Navigation and Localization;" International Conference on Robotics and Automation (ICRA); IEEE; 7 pages; 2019.

Chiang, HT L. et al. "Learning Navigation Behaviors End to End;" Cornell University; arXiv.org; arXiv:1809.10124v1; 9 pages; Sep. 26, 2018.

Hwangbo, J. et al., "Learning Agile and Dynamic Motor Skills for Legged Robots;" Science Robotics; 13 pages; Jan. 16, 2019.

Tan, J. et al., "Sim-to-Real: Learning Agile Locomotion for Quadruped Robots;" In Robotics: Science and Systems (RSS); 11 pages; Jun. 2018.

Chebotar, Y. et al., "Closing the Sim-to-Real Loop: Adapting Simulation Randomization with Real World Experience;" In 2019 International Conference on Robotics and Automation (ICRA), pp. 8973-8979, IEEE, 2019.

Finn, C. et al. "Model-Agnostic Meta-Learning for Fast Adaptation Of Deep Networks;" In Proceedings of the 34th International Conference on Machine Learning; vol. 70; 1126-1135; JMLR.org; 10 pages; 2017.

Yu, W. et al., "Learning Fast Adaptation with Meta Strategy Optimization;" Cornell University; arXiv.org;. arXiv:1909.12995v1; 7 pages; Sep. 28, 2019.

Tedrake, R. et al., "Learning to Walk in 20 Minutes;" In Proceedings of the Fourteenth Yale Workshop on Adaptive and Learning Systems; vol. 95585; 6 pages; 2005.

Morimoto, J. et al., "Improving Humanoid Locomotive Performance with Learnt Approximated Dynamics via Gaussian Processes for Regression;" In 2007 IEEE/RSJ International Conference on Intelligent Robots and Systems; 7 pages; Oct. 2007.

Zeng, A. et al., "TossingBot: Learning to Throw Arbitrary Objects with Residual Physics;" Cornell University; arXiv.org; arXiv:1903.11239v2; 13 pages; Jul. 3, 2019.

Li, T. et al., "Learning Generalizable Locomotion Skills With Hierarchical Reinforcement Learning;" Cornell University; arXiv.org; arXiv:1909.12324v1; 7 pages; Sep. 26, 2019.

Luck, K. et al., "From the Lab to the Desert: Fast Prototyping and Learning of Robot Locomotion;" Cornell University; arXiv.org; arXiv1706.01977v1; 9 pages; Jun. 6, 2017.

Choi, S. et al., "Trajectory-based Probabilistic Policy Gradient for Learning Locomotion Behaviors;" In 2019 International Conference on Robotics and Automation (ICRA); IEEE; 7 pages; 2019.

Yang, Y. et al. "Data Efficient Reinforcement Learning for Legged Robots;" Cornell University; arXiv.org; arXiv:1907.03613v2; Oct. 6, 2019.

Altman, E.; "Constrained Markov Decision Processes;" vol. 7; CRC Press; 250 pages; 1999.

Achiam, J. et al., "Constrained Policy Optimization;" International Conference on Machine Learning (ICML); 10 pages; 2017.

Alshiekh, M. et al., "Safe Reinforcement Learning Via Shielding;" In 32th AAAI Conference on Artificial Intelligence; 10 pages; 2018.

Chow, Y. et al., "Lyapunov-based Safe Policy Optimization for Continuous Control;" Cornell University; arXiv.org; arXiv:1901.10031v2; 21 pages; Feb. 11, 2019.

Lipton, Z. et al., "Combating Reinforcement Learning's Sisyphean Curse With Intrinsic Fear;" Cornell University; arXiv.org; arXiv:1611.01211v1; 9 pages; Nov. 3, 2016.

Berkenkamp, F. et al., "Safe Model-Based Reinforcement Learning with Stability Guarantees;" In Advances in Neural Information Processing Systems (NIPS); 11 pages; 2017.

Eysenbach, B. et al., "Leave No Trace: Learning to Reset for Safe and Autonomous Reinforcement Learning;" In International Conference on Learning Representations; 18 pages; 2018.

Haarnoja, T. et al., "Soft Actor-Critic Algorithms and Applications;" Cornell University; arXiv.org; arXiv:1812.05905v1; 18 pages; Dec. 13, 2018.

Ha, S. et al., "Automated Deep Reinforcement Learning Environment for Hardware of a Modular Legged Robot;" In International Conference on Ubiquitous Robots; 7 pages; Jun. 2018.

Tigas, P. et al., "Robust Imitative Planning: Planning from Demonstrations Under Uncertainty;" 33rd Conference on Neural Information Processing Systems (NeurIPS); 9 pages; 2019.

* cited by examiner

SYSTEM AND METHODS FOR TRAINING ROBOT POLICIES IN THE REAL WORLD

BACKGROUND

Control of legged robots may be decomposed into a modular design with multiple layers, such as state estimation, foot-step planning, trajectory optimization, and/or model-predictive control. For instance, researchers have demonstrated agile locomotion with quadrupedal robots using a state-machine, impulse scaling, and convex model predictive control. Similarly, bipedal robots can be controlled by the fast online trajectory optimization or whole-body control. This approach has been used for many locomotion tasks, from stable walking to highly dynamic running, but often requires considerable prior knowledge of the target robotic platform and task.

Recently, deep reinforcement learning (RL) has drawn attention as a general framework for acquiring control policies. It has been successful for finding effective policies for various robotic applications, including autonomous driving, navigation, and manipulation. Deep RL also has been used to learn locomotion control policies in simulated environments. Despite its effectiveness, one of the biggest challenges is to transfer the trained policies to the real world, which often incurs significant performance degradation due to the discrepancy between the simulated and real environments.

SUMMARY

Implementations disclosed herein are directed towards training a plurality of policy networks, in a real world workspace, for use by a robot in performing a plurality of corresponding locomotion tasks (e.g., walking forwards, running forwards, walking backwards, running backwards, rolling forwards, rolling backwards, turning left, turning right, hopping, additional or alternative task(s), and/or combinations thereof). In some implementations, each locomotion task can have a corresponding distinct policy network, where the robot can use the corresponding policy network in performing the task (e.g., can process one or state values capturing the state of the robot and/or the environment using the policy network to generate output, and can cause the robot to perform the locomotion task based on the output). For example, a first policy network, used by the robot to walk forwards, can be trained along with a second policy network, used by the robot to walk backwards.

In some implementations, the plurality of policy networks can be sequentially trained, where a first policy network is trained for one or more episodes, a second policy network is trained for one or more episodes, etc. In some implementations, the next policy network can be selected for training based on comparing the pose of the robot (i.e., the position and/or orientation of the robot) with one or more workspace parameters. Workspace parameters may include a location of a landmark within the workspace (e.g., the location of the center of the workspace), the location of an edge of the workspace, the location of an additional robot within the workspace, the location of an object within the workspace, the shape of the workspace, the size of the workspace, one or more additional or alternative parameters, and/or combinations thereof. In some implementations, the workspace can be divided into sectors, each sector corresponding to a policy network. In some of those implementations, workspace can be divided into sectors relative to the pose of the robot. The sector containing the one or more workspace parameters can be identified. In some implementations, the next policy network for training can be based on the policy network corresponding to the identified sector which includes the workspace parameter.

For example, two locomotion tasks and corresponding policy networks may be associated with a robot, walking forwards and walking backwards, and the workspace parameter can be the location of the center of the workspace. The workspace may be divided into two sectors based on the relative pose of the robot within the workspace, where a first sector corresponds with walking forwards and a second sector corresponds with walking backwards. The sector including the center of the workspace (i.e., the workspace parameter) can be determined and the policy network corresponding to the determined sector can be selected as the next training task.

In some implementations, the workspace parameter can be the location of the center of the workspace, and the next training task can be selected based on the locomotion task can move the robot towards the center of the workspace. For example, the robot can be facing away from the center of the workspace. Walking backwards can move the robot towards the center of the workspace, thus walking backwards can be selected as the initial training task. The robot can continue performing the task (i.e., walking backwards) until one or more task end conditions are satisfied. For example, the robot can continue walking backwards until the robot falls, until the robot reaches a workspace edge, until the robot has performed the task a threshold duration of time, until one or more additional or alternative conditions are satisfied, and/or combinations thereof.

In some implementations, one or more additional training tasks can be selected based on the task which can move the robot towards the workspace landmark(s) based on the updated position of the robot (i.e., based on the position of the robot after the completion of the previous training task). In some implementations, the robot can perform the same training task as the previous iteration. For example, the robot described above moving backwards towards the center of the workspace may fall before reaching the center of the workspace. In some such implementations, after the robot is reset, the robot may still be facing away from the center of the workspace. The system can select walking backwards as the second training task, can cause the robot to perform an additional episode of walking backwards, and can train the policy network corresponding to walking backwards based on the additional episode of walking backwards. Subsequent training tasks can similarly be selected based on the position of the robot performing the previous training tasks.

In some implementations, the plurality of tasks may include pairs of counter-tasks, where the first task moves the robot in a first direction and the second task moves the direction in the opposite direction (or substantially in the opposite direction). Example counter-tasks can include: walking forwards and walking backwards, turning left and turning right; moving up and moving down; and so forth. In some implementations, simultaneously training one or more pairs of counter tasks can aid the robot in staying within the workspace.

In some implementations, one or more portions of the policy network corresponding to the selected training task can be updated while the robot is still completing the task. For example, a policy network corresponding to the locomotion task of turning left can be updated while the robot is in the process of turning left. In some other implementations, one or more portions of the policy network corresponding to the selected training task can be updated after the robot has completed performing the task. For example, the locomotion task of turning left can be updated once the robot has completed turning left. In some implementations, when the robot falls during a training episode, the robot can reset itself automatically (or with minimal human intervention).

Accordingly, various implementations set forth techniques for training a plurality of policy networks in a real world workspace. In contrast, conventional techniques of training policy network(s) can include training the policy network(s) in simulation, where the simulation includes a model of the mobile robot and the environment. Training policy network(s) in the real world may not require models of the mobile robot and/or the environment. Computing resources (e.g., memory, processor cycles, power, etc.) can be conserved by eliminating the need to generate models (e.g., models of the robot, models of the environment, etc.) as well as eliminating the need to update the state of the model(s) while training policy network(s).

The above description is provided only as an overview of some implementations disclosed herein. These and other implementations of the technology are disclosed in additional detail below.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
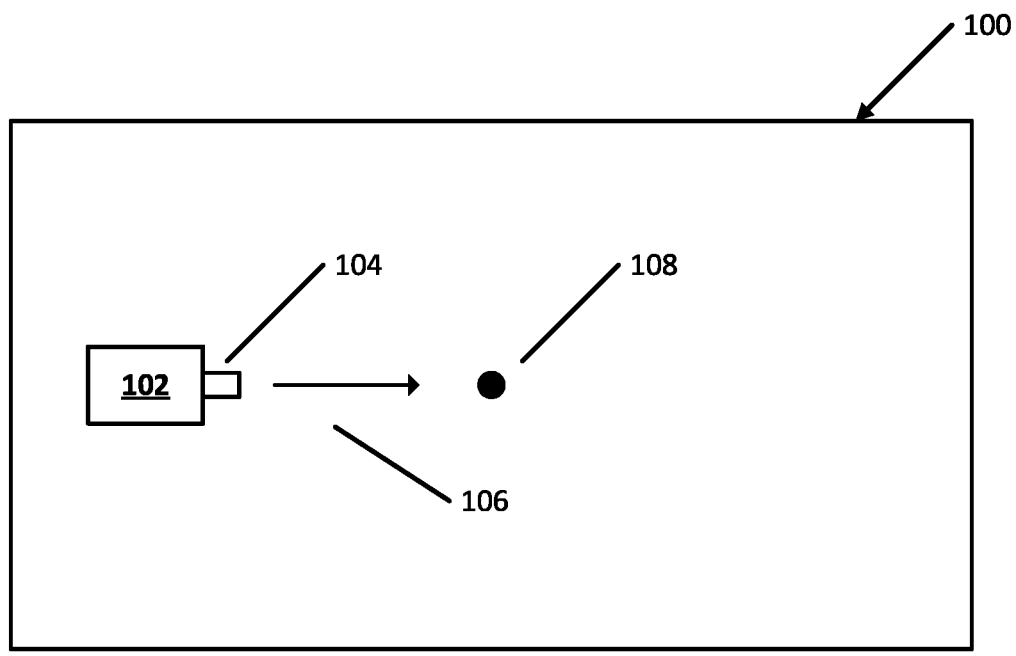
FIG. 1A illustrates an example robot with an example pose in an example workspace in accordance with implementations described herein.

Reliable and/or stable locomotion can be a challenge for mobile robots. Deep reinforcement learning (deep RL) has emerged as a promising approach for developing such control policies autonomously. Techniques disclosed herein are directed towards a system for learning legged locomotion policies with deep RL in the real world with minimal human intervention. Difficulties for on-robot learning systems can include automatic data collection and safety. Some implementations can overcome these two challenges by developing a multi-task learning procedure, an automatic reset controller, and/or a safety-constrained RL framework. The system can be tested, for example, on the task of learning to walk on three different terrains: flat ground, a soft mattress, and a doormat with crevices. In some implementations, the system can automatically and efficiently learn locomotion skills on a quadruped robot with little human intervention.

Traditional hand-engineered controllers for robot locomotion can often require expertise and manual effort to design. While this can be effective for a small range of environments, it may be hard to scale to the large variety of situations that the robot may encounter in the real world. In contrast, deep reinforcement learning (deep RL) can learn control policies automatically, without any prior knowledge about the robot or the environment. In principle, each time the robot walks on a new terrain, the same learning process can be applied to acquire an optimal controller for that environment.

However, despite the recent successes of deep reinforcement learning, these algorithms are often exclusively evaluated in simulation. Building fast and accurate simulations to model the robot and/or the rich environments that the robot may be operating in can be extremely difficult. Techniques disclosed herein can be used to develop a deep RL system that can learn to walk autonomously in the real world (e.g., not in simulation). In addition to finding a stable and efficient deep RL algorithm, challenges associated with the safety and the automation of the learning process may need to be addressed. During training, the robot may fall and damage itself, and/or leave the training area, which can require labor-intensive human intervention. Prior work that studied learning locomotion in the real world has focused on statically stable robots or relied on tedious manual resets between roll-outs.

Minimizing human interventions may be a key to a scalable reinforcement learning system. Some implementations focus on solving one or more bottlenecks in this problem: automation and/or safety. During training, the robot may need to automatically and safely retry the locomotion task hundreds or thousands of times. This may require the robot staying within the workspace bounds, minimizing the number of dangerous falls, and/or automating the resets between episodes. In some implementations, one or more of these challenges may be accomplished via a multi-task learning procedure, a safety-constrained learner, and/or several carefully designed hardware/software components. By simultaneously learning to walk in different directions, the robot may stay within the workspace. By automatically adjusting the balance between reward and safety, the robot may fall dramatically less. By building hardware infrastructure and designing stand-up controllers, the robot can automatically reset its states which can enable continuous data collection.

Some implementations can include an autonomous real-world reinforcement learning system for robotic locomotion, which can allow a mobile robot (e.g., a quadrupedal robot) to learn multiple locomotion skills on a variety of surfaces, with minimal human intervention. For example, the variety of surfaces can include flat ground, a soft mattress, a soft doormat with crevices, additional and/or alternative surface(s), and/or combinations thereof. In some implementations, the system can learn to walk on these terrains in just a few hours, with minimal human effort, and acquire distinct and specialized gaits for each surface. In contrast to the prior work, in which hundreds manual resets may be required in the simple case of learning to walk on flat ground, the system in accordance with some implementations may require zero manual resets in some cases. Additionally or alternatively, in some implementations, the system can train multiple policies simultaneously (e.g., train four policies simultaneously—a first policy for walking forward, a second policy for walking backwards, a third policy for turning left, and a fourth policy for turning right), which may form a complete skill-set for navigation and can be composed into an interactive directional walking controller at test time.

Control of mobile robots (e.g., legged robots) may be decomposed into a modular design with multiple layers, such as state estimation, foot-step planning, trajectory optimization, and/or model-predictive control. For instance, researchers have demonstrated agile locomotion with quadrupedal robots using a state-machine, impulse scaling, and convex model predictive control. Similarly, bipedal robots can be controlled by the fast online trajectory optimization or whole-body control. This approach has been used for many locomotion tasks, from stable walking to highly dynamic running, but often requires considerable prior knowledge of the target robotic platform and task. Instead, some implementations disclosed herein aim to develop an end-to-end on-robot training system that can automatically learn locomotion skills from real-world experience, which may require no prior knowledge about the dynamics of the robot.

Deep reinforcement learning has drawn attention as a general framework for acquiring control policies. Deep RL techniques can be used for finding effective policies for various robotic applications, including autonomous driving, navigation, and manipulation. Deep RL also has been used to learn locomotion control policies in simulated environments. Despite its effectiveness, one of the biggest challenges can be to transfer the trained policies to the real world, which can incur significant performance degradation due to the discrepancy between the simulated and real environments.

Researchers have investigated applying RL to real robotic systems directly, which is intrinsically free from the sim-to-real gap. The approach of learning on real robots can achieve state-of-the-art performance on manipulation and grasping tasks, by collecting a large amount of interaction data on real robots. However, applying the same method to underactuated legged robots is challenging. One major challenge is the need to reset the robot to the proper initial states after each episode of data collection, for hundreds or even thousands of roll-outs. This issue can be tackled by developing external resetting devices for lightweight robots, such as a simple one degree of freedom system or an articulated robotic arm. Otherwise, the learning process may require a large number of manual resets between roll-outs, which may limit the scalability of the learning system.

Another challenge can be to guarantee the safety of the robot during the entire learning process. Safety in RL can be formulated as a constrained Markov Decision Process (cMDP), which can be solved by the Lagrangian relaxation procedure. Extensions of the existing deep RL algorithms have been proposed to address safety, such as learning an additional safety layer that projects raw actions to a safe feasibility set, learning the boundary of the safe states with a classifier, expanding the identified safe region progressively, or training a reset policy alongside with a task policy.

Some implementations can include developing an autonomous and/or safe learning system for mobile robots, which can learn locomotion policies with minimal human intervention. Some implementations include a system for learning locomotion gaits in the real world with minimal human intervention. Aside from incorporating a stable and efficient deep RL algorithm, some implementations can address one or more of the following challenges. First, the robot must remain within the training area (workspace), which may be difficult if the system only learns a single policy that walks in one direction. Some implementations utilize a multi-task learning framework, which simultaneously learns multiple locomotion tasks for walking in different directions, such as walking forward, backward, turning left or right. This multi-task learner can select the task to learn according to the relative position of the robot in the workspace. For example, if the robot is about to leave the workspace, the selected task-to-learn would be walking backward. Using this simple state machine scheduler, the robot can remain within the workspace during the entire training process. Second, the system may need to minimize the number of falls because falling can result in substantially longer training times due to the overhead of experiment reset after each fall. Even worse, the robot can get damaged after repeated falls. Some implementations can augment the Soft Actor-Critic (SAC) formulation with a safety constraint that limits the roll and the pitch of the robot's torso. Solving this cMDP can reduce the number of falls during training. Third, in cases where falling is inevitable, the robot may need to stand up and reset its pose. Some implementations can include a stand-up controller, which allows the robot to stand up in a wide variety of fallen configurations. Some implementations disclosed herein may utilize one or more of these components, effectively reducing the number of human interventions to zero in many of the training runs.

In some implementations, the task of learning to walk can be formulated in the setting of reinforcement learning. The problem can be represented as a Markov Decision Process (MDP), which can be defined by the state space S, action space A, stochastic transition function $p(s_{t+1}|s_t, a_t)$, reward function $r(s_t, a_t)$, and the distribution of initial states $s_0 \sim p(s_0)$. By executing a policy $\pi(a_t|s_t) \in \Pi$, a trajectory of state and actions $\tau = (s_0, a_0, s_1, a_1, \ldots)$ can be generated. The trajectory distribution induced by $\pi$ is denoted by $\rho_\pi(\tau) = p(s_0)\Pi_t \, \pi_t(a_t|s_t)p(s_{t+1}|s_t, a_t)$. In some implementations, the goal is to find the optimal policy that maximizes the sum of expected returns:

$$J(\pi)E_{\tau \sim \rho_\pi}[\Sigma_{t=0}^T r(s_t, a_t)] \qquad (1)$$

An important cause of human intervention can be a need to move the robot back to the initial position after each episode. Otherwise, the robot can quickly leave the limit-sized workspace within a few rollouts. Carrying a heavy-legged robot back-and-forth hundreds of times can be labor-intensive. Some implementations can use a multi-task learning method with a simple state-machine scheduler that generates an interleaved schedule of multi-directional locomotion tasks, in which the robot can learn to walk towards the center of the workspace automatically.

In some implementations, a task can be defined by the desired direction of walking with respect to its initial position and orientation at the beginning of each roll-out. More specifically, in some of those implementations, the task reward r is parameterized by a three dimensional task vector $w = [w_1, w_2, w_3]^T$:

$$r_2(s,a) = [w_1, w_2]^T \cdot R_0^{-1}(x_t - x_{t-1}) + w_3(\theta_t - \theta_{t-1}) - 0.001|\ddot{a}|^2 \qquad (2)$$

where $R_0$ is the rotation matrix of the base at the beginning of the episode, $x_t$ and $\theta_t$ are the position and yaw angle of the base in the horizontal plane at time t, and ä measures smoothness of actions, which can be, for example, the desired motor acceleration. This task vector w can define the desired direction of walking. For example, walking forward is $[1, 0, 0]^T$ and turning left is $[0, 0, 0.5]^T$. Note that, in some implementations, the tasks can be locally defined and invariant to the selection of the starting position and orientation of each episode.

At the beginning of the episode, the scheduler can determine the next task to learn from the set of predefined tasks $W=\{w^1, \ldots, w^n\}$ based on the relative position of the center of the workspace in the robot's coordinate. In effect, in some implementations the scheduler can select the task in which the desired walking direction is pointing towards the center. This can be done by dividing the workspace in the robot's coordinate with the fixed angles and selecting the task where the center is located in its corresponding subdivision. For example, assuming two tasks: forward and backward walking, the scheduler can select the forward task if the workspace center is in front of the robot, and can select the backward task in the other case. Note that a simple round-robin scheduler will not work because the tasks may not be learned at the same rate.

In some implementations, the multi-task learning method can be based on one or both of two assumptions: First, it can be assumed that even a partially trained policy still can move the robot in the desired direction even by a small amount most of the time. In some implementations, this can be true since the initial policy is not likely to move the robot far away from the center, and as the policy improves, the robot quickly begins to move in the desired direction, even if it does so slowly and unreliably at first. For example, after 10 to 20 roll-outs, the robot may start to move at least 1 cm, by pushing its base in the desired direction. The second assumption is that, for each task in the set W, there is a counter-task that moves in the opposite direction. For example, walking forward versus backward or turning left versus right. Therefore, if one policy drives the robot to the boundary of the workspace, its counter-policy can bring it back. Experience shows both assumptions hold for most scenarios, unless, for example, the robot accidentally gets stuck at the corners of the workspace.

A policy for each task can be trained with a separate instance of learning, without sharing actors, critics, and/or a replay buffer. In some implementations, this design decision can be made to help achieve performance gains, because the definition of tasks may not be discrete and the experience from one task may not be helpful for other tasks.

Although multi-task learning can reduce the number of out-of-bound failures by scheduling a task-to-learn between episodes, the robot can still occasionally leave the workspace if it travels a long distance in one episode. Some implementations can prevent this by triggering early termination (ET) when the robot is near and continues moving towards the boundary. In contrast to falling, this early termination may require special treatments for return calculation. Since the robot does not fall and can continue executing the task if it is not near the boundary, some implementations can take future rewards into consideration when updating the corresponding policy, for example, when computing the target values of Q functions.

Repeated falls may not only damage the robot, but may also significantly slow down training, since the robot must stand up after it falls. To mitigate this issue, some implementations can use a constrained MDP to find the optimal policy that maximizes the sum of rewards while satisfying the given safety constraints $f_s$:

$$E_{\tau \sim p_\pi}[\Sigma_{t=0}^T r(s_t, a_t)] \text{ s.t. } E_{(s_t, a_t) \sim p_\pi}[f_s(s_t, a_t)] \geq 0, \forall t. \quad (3)$$

In some implementations, the safety constraints can be designed to prevent falls (e.g., forward falls, backward falls, left falls, right falls, one or more additional falls, and/or combinations thereof) that can easily damage the servo motors:

$$f_s(s_t, a_t) = (\hat{p} - |p_t|, \hat{r} - |r_t|) \quad (4)$$

where p and r are the pitch and roll angles of the robot's torso, and $\hat{p}$ and $\hat{r}$ are the maximum allowable tilt, where they may be set to $\pi/12$ and $\pi/6$ for one or more experiments.

In some implementations, the constrained optimization can be rewritten by introducing a Lagrangian multiplier $\lambda$:

$$L(\pi, \lambda) = E_{\tau \sim p_\pi}[\Sigma_{t=0}^T r(s_t, a_t) + \lambda f_s(s_t, a_t)] \quad (5)$$

In some implementations, this objective can be optimized using the dual gradient descent method, which alternates between the optimization of the policy $\pi$ and the Lagrangian multiplier $\lambda$. In some implementations, both Q functions for the regular reward $Q_\theta$ and the safety term $Q_\psi^s$ can be trained, which are parameterized by $\theta$ and $\psi$ respectively. Additionally or alternatively, the following actor loss can be obtained:

$$E_{s_t \sim D, a_t \sim \pi_\theta}[-Q_{74}(s_t, a_t) - \lambda Q_\psi^s(s_t, a_t)] \quad (6)$$

where D is the replay buffer. Additionally or alternatively, the Lagrangian multiplier $\lambda$ can be learned by minimizing the loss $J(\lambda)$:

$$E_{s_t \sim D, a_t \sim \pi_\theta}[\lambda f_s(a_t, s_t)] \quad (7)$$

In some implementations, additional hardware and/or software features can be utilized to facilitate a safe and autonomous real-world training environment. For example, while safety constraints can significantly reduce the number of falls, experiencing some falls can be inevitable because most RL algorithms rely on failure experience to learn effective control policies. To eliminate the manual resets after the robot falls, some implementations can utilize an automated stand-up controller that can recover the robot from a wide range of failure configurations. For example, the stand-up controller can be manually-engineered based on a simple state machine, which pushes the leg on the fallen side and/or adjusts the leg angles to roll back to the initial orientation. One challenge of designing such a stand-up controller can be that the robot may not have enough space and torque to move its legs underneath its body in certain falling configurations due to the weak direct-drive motors. For this reason, in some implementations a box made of cardboard can be attached underneath the robot. When the robot falls, this small box can give the robot additional space for moving its legs, which can prevent the legs from getting stuck and/or prevent the servos from overheating.

Additionally or alternatively, the robot may get tangled by the tethering cables when it walks and turns. Some implementations can utilize a cable management system so that all the tethering cables, including power, communication, and motion capture, are hung above the robot. For example, the cables can be wired through a 1.2 m rod that is mounted at the height of 2.5 m and the cable length can be adjusted to maintain the proper slackness. In some implementations, the workspace has an elongated shape (5.0 m by 2.0 m), thus one end of the rob may be connected to a hinge joint at the midpoint of the long side of the workspace, which allows the other end of the rod to follow the robot passively.

Furthermore, to reduce the wear-and-tear of the motors due to the jerky random exploration of the RL algorithm, some implementations can post-process the action commands, for example, with a first-order low-pass Butterworth filter with a cutoff frequency of 5 Hz.

As an illustrative example, some implementations can be tested using a small-scale quadruped robot, which is approximately 7 kg with 0.60 m body length. The robot has eight direct-drive servo motors to move its legs in the sagittal plane. Each leg is constructed as a four-bar linkage and is not symmetric: the end-effector (one of the bars) is longer and points towards the forward direction. The robot may be equipped with motor encoders that read joint positions and an IMU sensor that measures the torso's orientation and angular velocities in the roll and pitch axes. In some implementations, the state of the robot may consist of motor angles, IMU readings, and/or previous actions, in the last six time steps. The robot may be directly controlled from a non-real time Linux workstation (Xeon E5-1650 V4 CPU, 3.5 GHz) at about 50 Hz. At each time step, the action, the target motor angles, can be sent to the robot with relatively low PD gains, 0.5 and 0.005. While collecting the data from the real-world, the neural networks can be trained by taking two gradient steps per control step. For example, Equation 2 can be used as the reward function, which is parameterized by task weights w.

In some implementations, the safety-constrained MDP (Equation 3 and 4) can be solved using the off-policy learning algorithm, Soft Actor-Critic (SAC), which has an additional inequality constraint for the policy entropy. Therefore, two Lagrangian multipliers, α for the entropy constraint and λ for the safety constraint can be optimized by applying dual gradient descent to both variables. In some implementations, the policy and the value functions can be represented with fully connected feed-forward neural networks with two hidden-layers, 256 neurons per layer, and ReLU activation functions. The network weights can be randomly initialized and learned with Adam optimizer with the learning rate of 0.0003.

Some implementations can be tested in an area of 5×2 m flat ground using the two-task configuration (walking forward or backward). Some implementations may successfully train both policies from scratch on the flat surface, with zero human intervention. In addition, some implementations may require far less data than other approaches. For example, prior techniques may need 2 hours or 160 k steps, to learn a single policy, the total time of training two policies using a system with some implementations disclosed herein may be about 1.5 hours, which is approximately 60 k steps or 135 episodes. This greatly-improved efficiency can be because the system may update the policy for every single step of the real-world execution, which can be more sample efficient than the episodic, asynchronous update scheme of prior approaches.

In some implementations, the robot's asymmetric leg structure can lead to different gaits when walking forward and backward. Forward walking can require higher foot clearance because otherwise, the front-facing feet can easily stab the ground, causing large frictions and leading to falling. In contrast, the robot can drag the feet when it walks backward, even if they are sliding on the ground. As a consequence, the learned forward locomotion resembles a regular pacing gait with high ground clearance and the backward locomotion can be roughly classified as a high-frequency bounding gait.

Although a small number of manual resets may still be required occasionally, for example when the robot is stuck at the corner, many training runs can be finished with zero human interventions. In an example training session, an implementation disclosed herein automatically recovered from 16 falls and 33 flips, by invoking the stand-up controller for 49 times. Without the multi-task learner, the robot may have left the workspace 40 times.

Additionally or alternatively, the system can be tested in the four-task configuration, which includes walking forward, walking backward, turning left, and turning right. These four tasks may form a complete set of high-level navigation commands.

Implementations described herein may also be applied to more challenging surfaces, such as a soft mattress and/or a doormat with crevices. A soft mattress is made of gel memory foam, 4 cm thick, with a size of 1.85 m by 1.3 m. A doormat can be made of rubber, 1.5 cm thick, with a size of 0.6 m by 1.2 m. We combine eight doormats to obtain the 2.4 m by 2.4 m workspace. Both surfaces can be "challenging" in that they can be extremely difficult to model. Additionally, a policy trained on flat ground cannot walk on either surface, although the maximum-entropy RL is known for learning robust policies.

In some implementations, the framework can successfully learn to walk forward and backward on both challenging surfaces. In some implementations, training on these surfaces can require more samples than the flat surface. For example, training to walk forward and backward can take a total 200 k steps for the mattress and 150 k steps for the doormat. In both cases, learning to walk backward can be slightly easier than the forward locomotion task. On the soft mattress, learned policies find gaits with larger ground clearance than the flat ground by tilting the torso more. Particularly, the learned forward policy may not be homogeneous over time and can alternate among pacing, galloping, and pronking gaits, although each segment does not perfectly coincide with the definition of any particular gait. Locomotion policies on a doormat may be more energetic than flat terrain policies in general. For example, it may be observed that the forward policy often shakes the leg when it is stuck within a crevice, which makes a key difference from the policy trained on the flat surface.

Although the framework can greatly reduce the number of failures, it may still require a few manual resets when training locomotion on the challenging surfaces. The increased number of manual resets compared to the flat ground can be due to the reduced size of the workspace. In addition, the automated stand-up controller can sometimes fail when the foot is stuck firmly in a crevice.

Turning now to the figures, FIG. 1A illustrates a robot 102 within a training workspace 100. In the illustrated example, the workspace landmark is the center of the workspace 108, where training tasks can be selected to move the robot 102 towards the center of the workspace 108 in direction 106. Robot 102 is located to the left of the center of the workspace 102, and is oriented such that the head of the robot 104 is oriented towards the center of the workspace 108. In some implementations, the system can select the next training task based on the pose of the robot 102 with respect to the center of the workspace 108. For instance, the pose of the robot 102 (i.e., the position of the robot to the left of the center of the workspace and/or the orientation of the robot with the head of the robot directed towards the center of the workspace) can be used to select the training task of walking forwards, where the robot moves in direction 106, towards the center of the workspace 108.

Figure 1B:
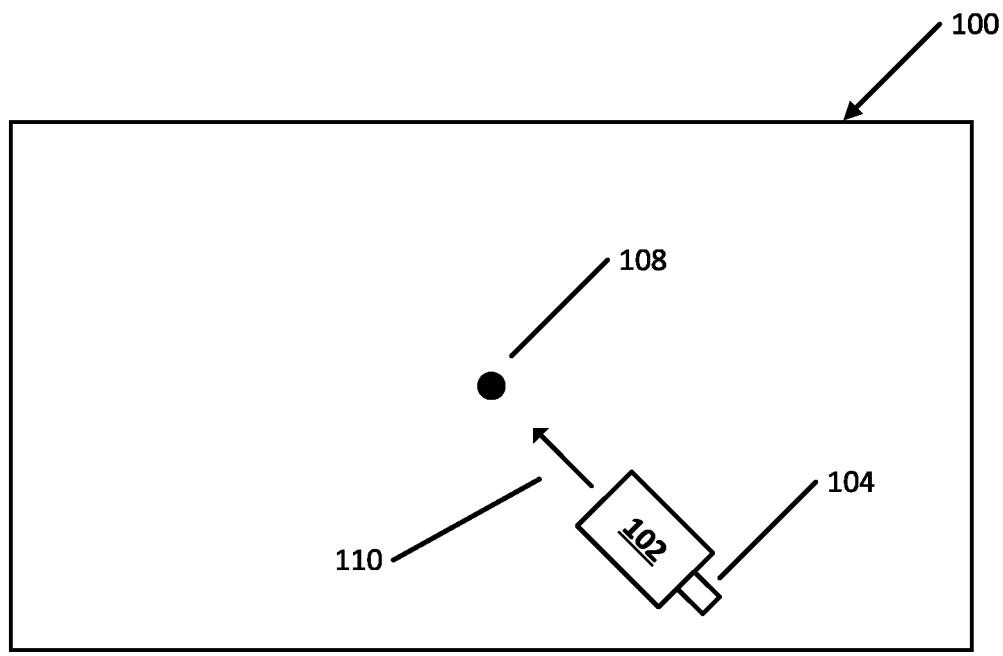
FIG. 1B illustrates the example robot with an additional example pose in the example workspace in accordance with implementations disclosed herein.

Similarly, FIG. 1B illustrates the robot 102 within the training workspace 100, where the training workspace 100 has a workspace landmark of the center of the workspace 108. However, the pose of robot 102 in FIG. 1B is different from the pose of robot 102 in FIG. 1A. As illustrated in FIG. 1B, robot 102 is located below and to the right of the center of the workspace 108 (i.e., the location of robot 102 in FIG. 1B and the head of the robot 104 is directed away from the center of the workspace 108 (i.e., the orientation of robot 102 in FIG. 1B). In some implementations, the system can select the training task of walking backwards in direction 110 towards the center of the workspace 108.

FIGS. 1A and 1B are described with a workspace landmark of the center of the workspace 108. However, this is merely illustrative and additional and/or alternative workspace landmark(s) may be utilized. In some implementations, the workspace landmark can be an one or more additional locations one or more of the corners of the workspace, the top edge of the workspace, the bottom edge of the workspace, the right edge of the workspace, the left edge of the workspace, the edge of the workspace closest to the position of the robot, the edge of the workspace furthest away from the position of the robot, additional and/or alternative locations within the workspace, and/or combinations thereof.

Similarly, the workspace 100 illustrated in FIGS. 1A and 1B is a rectangle. However, this is merely illustrative. In some implementations, a variety of workspaces may be utilized such as a square workspace, a circular workspace, a three sided workspace, a five sided workspace, a workspace with one additional and/or alternative numbers of sides, a three dimensional workspace, additionally and/or alternatively shaped workspaces, and/or combinations thereof. Furthermore, the workspace can be made up of a variety of terrains, such as flat ground, a grassy surface, a mattress, a brick surface, a hardwood floor, a hilly surface, stairs, a gravel surface, a carpeted surface, a tile surface, a wet surface, one or more additional and/or alternative surfaces, and/or combinations thereof. For example, a rectangular workspace can include a grass surface portion and a brick surface portion. As another example, a triangular workspace can include a gravel surface portion, a muddy surface portion, and a tile surface portion. These examples are merely illustrative and additional and/or alternative workspaces may be used in accordance with implementations disclosed herein.

Figure 2:
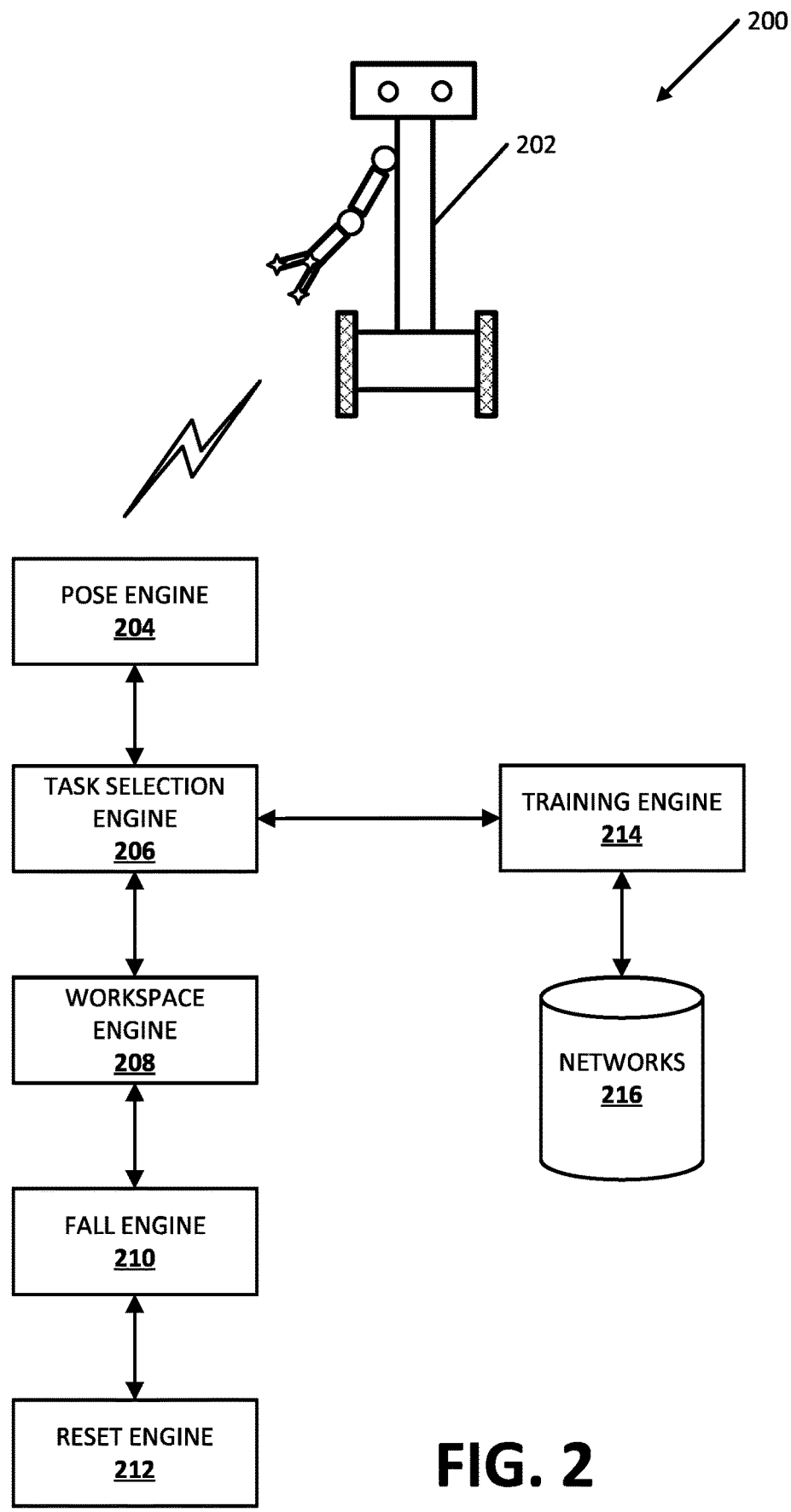
FIG. 2 illustrates an example environment in which implementations described herein may be implemented.

FIG. 2 illustrates example environment 200 including example robot 202. Robot 202 is wheeled robot capable of performing a variety of locomotion tasks (e.g., walking forwards, walking backwards, turning left, turning right, flying up, flying down, performing additional and/or alternative task(s), and/or combinations thereof) on a variety of terrains (e.g., a flat surface, a soft mattress surface, a grassy surface, a wet surface, a hilly surface, a gravel surface, additional and/or alternative terrain(s), and/or combinations thereof). Robot 202 may be in communication with one or more engines such as pose engine 204, task selection engine 206, workspace engine 208, fall engine 210, rest engine 212, training engine 214, additional and/or alternative engine(s) (not depicted), and/or combinations thereof. Additionally or alternatively, robot 202 may utilize one or more neural networks 216, additional and/or alternative network(s) (not depicted), and/or combinations thereof.

Although a particular wheeled robot 202 is illustrated in FIG. 2, additional and/or alternative robots may be utilized, including legged robots (e.g., a one legged robot, a two legged robot, a three legged robot, a four legged robot, etc.), robots having an animal form, robots that move via one or more wheels (e.g., self-balancing robots), submersible vehicle robots, unmanned aerial vehicles (UAVs), and so forth.

Data from robot 202 (e.g., state data) can be utilized to train one or more neural networks 216 using training engine 214. In some implementations, neural networks 216 can include a plurality of policy networks, where each policy network can be used by the robot in performing a locomotion task. In some implementations, each policy network can correspond to a distinct locomotion task. In some implementations, neural networks 216 can include one or more critic networks, where a policy network (i.e., an actor network) and a corresponding critic network can be part of an actor-critic model, where the critic network can be used in training the policy network). In some of those implementations, a policy network and a corresponding critic network may be part of a soft-actor critic network. However, this is merely illustrative and additional and/or alternative networks may be utilized in accordance with implementations described herein. In some implementations, one or more of the policy networks 216 can be trained in simulation (i.e., trained in a virtual environment where the robot and the environment are simulated) prior to training the policy network in the real world. In some other implementations, one or more of the policy networks 216 can be trained in the real world without initial training in simulation.

Pose engine 204 can be used to determine the pose of robot 202. In some implementations, the pose of the robot can include the location of the robot within the workspace and/or the orientation of the robot within the workspace. For example, robot 102 in workspace 100 is illustrated in a first pose in FIG. 1A, and is illustrated in a second pose distinct from the first pose in FIG. 1B.

In some implementations, pose engine 204 can determine the pose of robot 202 based on one or more instances of sensor data captured using one or more sensors of the robot. For example, the robot can include a variety of sensors (not depicted) such as vision sensor(s), light sensor(s), pressure sensor(s), pressure wave sensor(s) (e.g., microphones), proximity sensor(s), accelerometer(s), gyroscope(s), thermometer(s), barometer(s), and so forth. Additionally or alternatively, the pose engine 204 can determine the pose of robot 202 based on data captured using one or more workspace sensors placed in or around the workspace. For example, one or move vision sensors can be mounted over the workspace such that the vision sensor(s) have a view of at least a portion of the workspace. A variety of workplace sensors may be utilized such as vision sensor(s), light sensor(s), pressure sensor(s), pressure wave sensor(s) (e.g., microphones), proximity sensor(s), accelerometer(s), gyroscope(s), thermometer(s), barometer(s), and so forth. In some implementations, data captured using one or more sensors of the robot and/or one or more sensors of the workspace can be utilized in determining the pose of the robot.

In some implementations, task selection engine 206 can be used to select the next locomotion task for use in training the robot. In other words, task selection engine 206 can select the next training task, and the policy network 216 corresponding to the selected training task can be updated using training engine 214. In some implementations, the next training task can be selected based on the pose of the robot (such as a robot pose determined using pose engine 204) with respect to one or more workspace parameters, such as the location of one or more workspace landmarks, the location of one or more additional robots in the workspace, the location of one or more objects in the workspace, etc. In some implementations, the task selection engine 206 can select the locomotion task to move the robot towards a workspace landmark. Additionally or alternatively, the task selection engine 206 can select the locomotion task to move the robot away from the landmark. The workspace landmark can include a variety of location(s) within a workspace including the center of the workspace, one or more of the corners of the workspace, one or more of the edges of the workspace, the closest edge of the workspace, the furthest edge of the workspace, additional and/or alternative location(s) in the workspace, and/or combinations thereof.

In some implementations, workspace engine 208 can use one or more instances of sensor data (e.g., instance(s) of robot sensor data, instance(s) of workspace sensor data, etc.) to determine whether robot 202 is at (or near) an edge of the workspace. For example, an indication of the edge of the workspace (e.g., a line marking the edge of the workspace) can be identified in an instance of vision data captured using one or more vision sensors of the robot. Additionally or alternatively, workspace sensor data can provide an indication the robot 202 is at (or near) the edge of the workspace. For instance, the workplace sensors can include one or more motion capture sensors, and the corresponding motion capture data indicate the relative position of the robot 202 to the workspace. Additionally or alternatively, the workspace sensors can include an infrared beam sensor (e.g., the infrared beam sensor can be placed along or near the edge of the workspace), and the corresponding sensor data can indicate whether the robot 202 has broken the infrared beam, where breaking the infrared beam may indicate the robot is at or near the edge of the workspace. Additionally or alternatively, one or more proximity sensors may be placed around the edge of the workspace for use in determining whether robot 202 is approaching the edge of the workspace. In some implementations, GPS data indicating the position of the robot 202, when compared with the location of the workspace, may be used to determine whether the robot 202 is at or near the edge of the workspace. In some implementations, signal strength data, such as Wi-Fi signal strength data, Bluetooth signal strength data, etc., may be used to determine whether robot 202 is at or near the edge of the workspace. For example, the robot 202 may emit a Wi-Fi signal. One or more receivers may be located throughout the workspace, such as one receiver located at each corner of a rectangular workspace. In some implementations, the system may determine the location of the robot based on the Wi-Fi signal strength measured at each of the receivers. For instance, the receiver closest to the robot 202 can measure the strongest Wi-Fi signal. By comparing the strength of the Wi-Fi signal measured at each of the receivers, the system can localize the robot 202 within the workspace. Additionally or alternatively, robot 202 can include a signal receiver and one or more signal transmitters may be placed throughout the workspace. In some implementations, the system can determine the location of robot 202 within the workspace based on the signal strength from the one or more transmitters captured by the robot 202.

Fall engine 210 can be used to detect when robot 202 falls. In some implementations, fall engine 210 can determine when the robot falls based on sensor data captured using one or more robot sensors and/or one or more workspace sensors.

Reset engine 212 can be used to reset the robot 202 after a fall (e.g., after fall engine 210 determines the robot has fallen). In some implementations, reset engine 212 can automatically reset the robot 202 after a fall. In some implementations, a fall can separate a first training episode from a second training episode. In some implementations, reset engine 212 can be used to reset robot 202 between training episodes with no (or minimal) human interaction. For example, robot 202 can include one or more actuators which can be controlled to move robot 202 into an upright position.

In some implementations, training engine 214 can be used to train one or more of the neural networks 216. In some implementations, training engine 214 can train one or more of the neural networks 216 in accordance with process 300 of FIG. 3 described herein.

Figure 3:
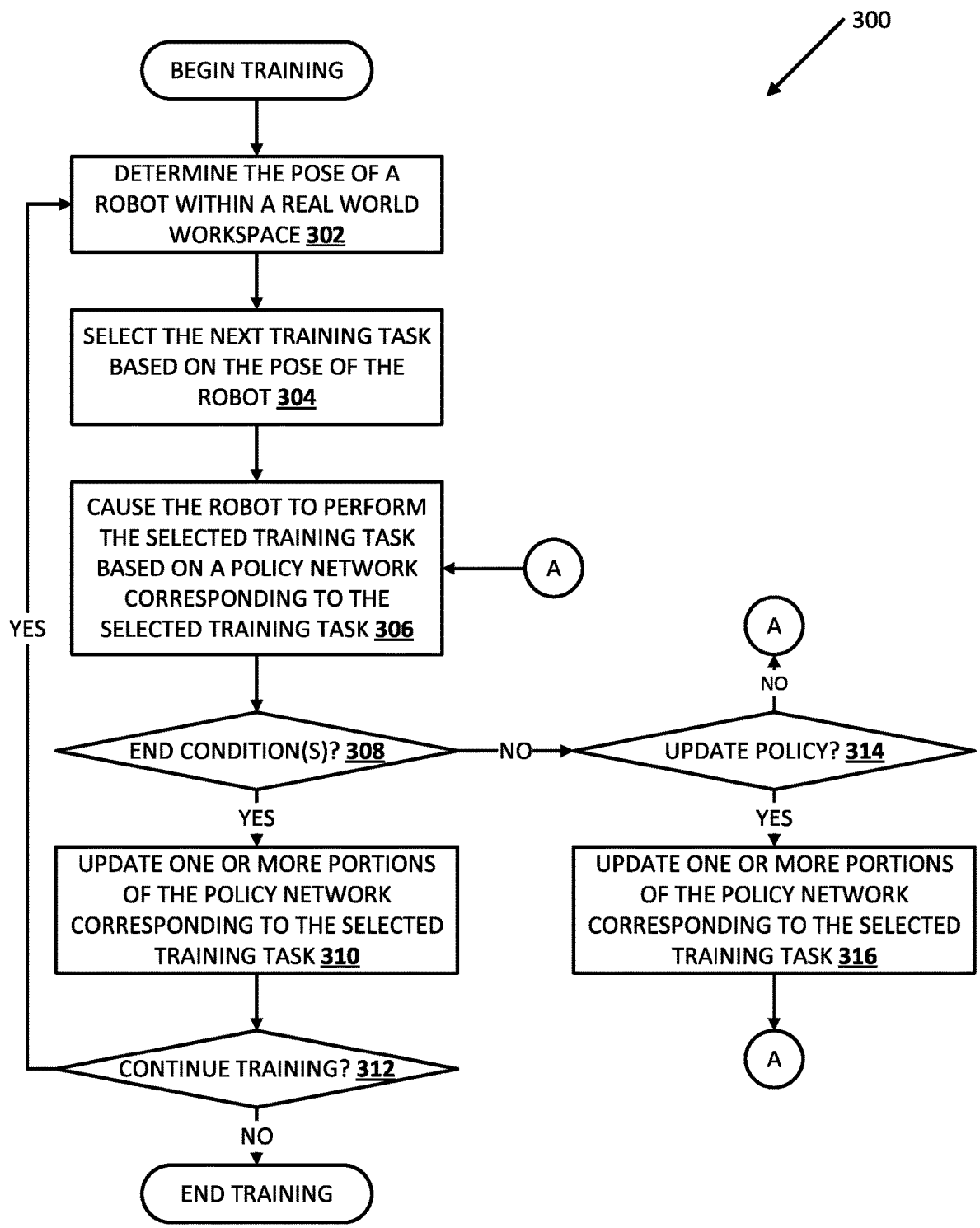
FIG. 3 is a flowchart illustrating an example process in accordance with implementations described herein.

FIG. 3 is a flowchart illustrating an example process 300 of training one or more policy networks in accordance with implementations disclosed herein. For convenience, the operations of process 300 are described with reference to a system that performs the operations. This system may include various components of various computer systems, such as one or more components depicted in FIG. 2, FIG. 5 and/or FIG. 6. Moreover, while operations of process 300 are shown in a particular order, this is not meant to be limiting. One or more operations by be reordered, omitted, and/or added.

At block 302, the system determines the pose (i.e., the position and/or orientation) of a robot within a real world workspace. In some implementations, the system can determine the pose of the robot within the real world workspace based on instance(s) of sensor data collected by one or more sensors of the robot, one or more sensors of the real world workspace, one or more additional or alternative sensors, and/or combinations thereof. In some implementations, the system can determine the pose of the robot using pose engine 204 of FIG. 2. For example, the system can determine the pose of the robot based on one or more instances of vision data captured using one or more vision sensors, such as an overhead camera capturing at least a portion of the workspace, a camera of the robot, additional or alternative vision sensor(s), and/or combinations thereof.

At block 304, the system selects the next training task based on the pose of the robot. In some implementations, the system can select the next training task using task selection engine 206 of FIG. 2 and/or process 400 of FIG. 4.

At block 306, the system causes the robot to perform the selected training tasks based on a policy network corresponding to the selected training task. For example, the system can select a turn right locomotion task as the next training task as step 304. The system can select the policy corresponding to the selected task (i.e., select the policy network corresponding to turning right) and can cause the corresponding policy network in causing the robot to perform the selected training task. For example, the system can process state data, capturing the current state of the robot, using the selected policy network, to generate output. The system can cause the robot to perform the selected training task based on the generated output.

At block 308, the system determines whether one or more task ending conditions are satisfied. For example, the system can determine whether the robot is at the edge of the workspace, whether the robot has fallen, whether the robot has performed the selected task for a threshold number of iterations (e.g., whether the robot has performed the selected training task for 10 iterations, for 100 iterations, for 1000 iterations, and/or for an additional or alternative number of iterations), whether the robot has performed the selected task for a threshold amount of time (e.g., the robot has performed the selected task for 10 milliseconds, 50 milliseconds, 1 second, 10 seconds, 30 seconds, 60 seconds, and/or additional or alternative amounts of time), whether additional and/or alternative condition(s) are satisfied, and/or combinations thereof. If one or more task ending conditions are satisfied, the system proceeds to block 310 and updates one or more portions of the policy network corresponding to the selected training task. If not, the system proceeds to block 314 and determines whether to update the policy network corresponding to the selected task.

At block 310, the system updates one or more portions of the policy network corresponding to the selected training task. For example, the system can determine a reward based whether the one or more conditions were satisfied at step

308. In some implementations, the system can update one or more portions of the policy network corresponding to the selected training task based on the determined reward.

At block 312, the system determines whether to continue training. For example, the system can determine whether any policy network has been trained a threshold number of epochs, whether each of the policy networks have been trained a threshold number of epochs, whether the system has trained the policy network(s) for a threshold duration of time, whether one or more additional and/or alternative training conditions have been satisfied, and/or combinations thereof. If the system determines to continue training, the system proceeds back to block 302, determines an additional pose of the robot and proceeds to block 304 and selects an additional training task based on the additional pose of the robot, before proceeding to blocks 306, and 308 based on the additional task. If not, the process ends.

At block 314, the system determines whether to update one or more portions of the policy network corresponding to the selected training task (i.e., the next training task selected at block 304). For example, the system can determine whether to update one or more portions of the selected training task while the robot is still performing the training task. If the system determines to update portion(s) of the policy network corresponding to the selected training task the system proceeds to block 316. If not, the system proceeds back to block 306 and causes the robot to continue performing the selected training task based on the policy network corresponding to the selected training task (e.g., causes the robot to perform an additional iteration of performing the selected task).

At block 316, the system updates one or more portions of the policy network corresponding to the selected training task before proceeding back to block 306 and continues to cause the robot to perform the selected training task (e.g., cause the robot to perform another iteration of performing the training task). In some implementations, the system can determine a reward based on determining whether one or more end conditions are satisfied at block 308, and the system can update one or more portions of the policy network based on the determined reward.

Figure 4:
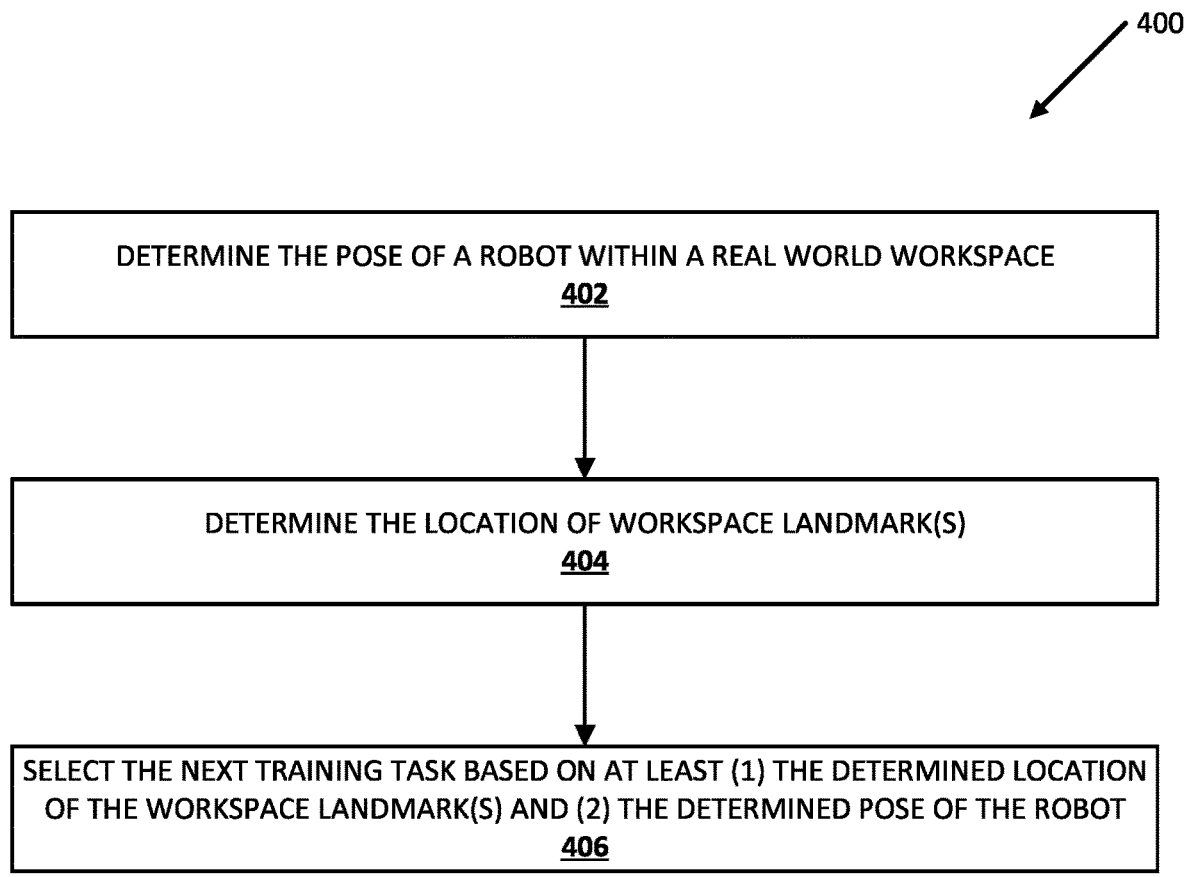
FIG. 4 is a flowchart illustrating another example process in accordance with implementations described herein.

FIG. 4 is a flowchart illustrating an example process 400 of selecting the next training task for use in training the plurality of policy networks in accordance with implementations disclosed herein. For convenience, the operations of process 400 are described with reference to a system that performs the operations. This system may include various components of various computer systems, such as one or more components depicted in FIG. 2, FIG. 5 and/or FIG. 6. Moreover, while operations of process 400 are shown in a particular order, this is not meant to be limiting. One or more operations by be reordered, omitted, and/or added.

At block 402, the system determines a pose of a robot within a real world workspace. In some implementations, the pose of the robot may include the position and/or orientation of the robot within the workspace. In some implementations, the system can determine the pose of the robot using pose engine 204 of FIG. 2. In some implementations, the system determines the pose of the robot based on one or more instances of sensor data. For example, the system can determine the position and/or orientation of the robot in the workspace based on one or more instances of vision data captured via one or more vision sensors (e.g., one or more cameras) mounted above the workspace. Additionally or alternatively, the system can determine the position and/or orientation of the robot based on instance(s) of sensor data capturing the angle of one or more actuators of the robot (e.g., capturing the angle of actuator(s) in a robotic arm to determine the pose of the robotic arm).

At block 404, the system determines the location of one or more workspace landmarks. For example, the system can determine the location of the center of the workspace. In some implementations, the system can divide the workspace into a plurality of sectors. In some of those implementations, the plurality of sectors can be based on the relative position of the robot. In other words, the sector directly in front of the robot may remain the same regardless of the orientation of the robot within the workspace. In some implementations, each sector can correspond to a distinct locomotion task. For instance, a robot can have four locomotion tasks, walking forwards, walking backwards, turning left, and turning right. The workspace may be divided into four corresponding sectors relative to the position of the robot, such as the sector in front of the robot corresponding to walking forwards, the sector behind the robot corresponding to walking backwards, the sector to the left of the robot corresponding to turning left, and the sector to the right of the robot corresponding to turning right. In some implementations, the system can determine the location of the workspace landmark(s) based on identifying the sector containing the workspace landmark(s). In some implementations, the system can determine the location of the one or more workspace landmarks using workspace engine 208 of FIG. 2.

At block 406, the system selects the next training task based on at least (1) the location of the workspace landmark(s) and (2) the pose of the robot. In some implementations, the system can select the next training task using task selection engine 206 of FIG. 2. In some implementations, the system can select the next training task based on the task corresponding to the sector containing the workspace landmark(s). For example, the system can select the next training task of walking backwards when the center of the workspace is behind the robot, and thus the center of the workspace is in the sector corresponding to the task of walking backwards. Similarly, the system can select the next training task of turning right when the center of the workspace is to the right of the robot, thus the center of the workspace is in the sector corresponding to the task of turning right.

Figure 5:
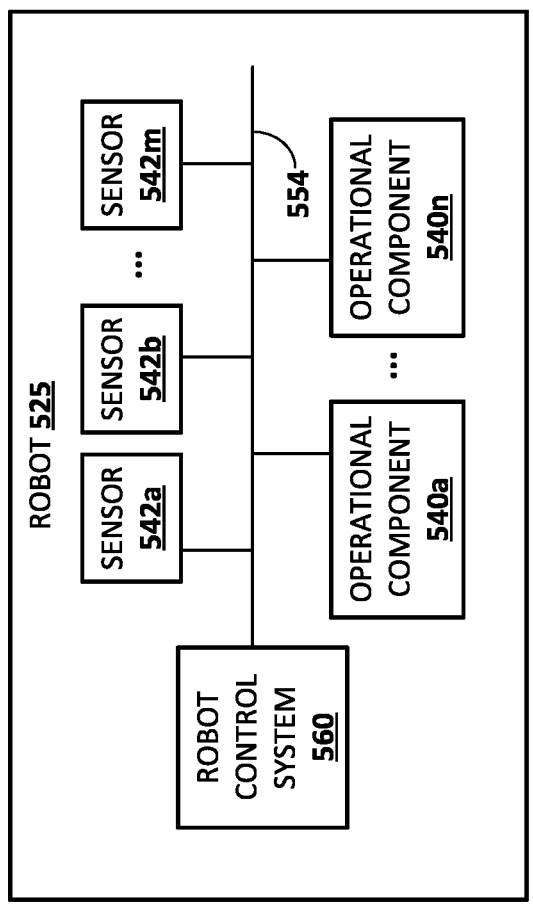
FIG. 5 schematically depicts an example architecture of a robot.

FIG. 5 schematically depicts an example architecture of a robot 525. The robot 525 includes a robot control system 560, one or more operational components 525*a*-525*n*, and one or more sensors 542*a*-542*m*. The sensors 542*a*-542*m* may include, for example, vision sensors, light sensors, pressure sensors, pressure wave sensors (e.g., microphones), proximity sensors, accelerometers, gyroscopes, thermometers, barometers, and so forth. While sensors 542*a*-*m* are depicted as being integral with robot 525, this is not meant to be limiting. In some implementations, sensors 542*a*-*m* may be located external to robot 525, e.g., as standalone units.

Operational components 540*a*-540*n* may include, for example, one or more end effectors and/or one or more servo motors or other actuators to effectuate movement of one or more components of the robot. For example, the robot 525 may have multiple degrees of freedom and each of the actuators may control actuation of the robot 525 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 560 may be implemented in one or more processors, such as a CPU, GPU, and/or other controller(s) of the robot 525. In some implementations, the robot 525 may comprise a "brain box" that may include all or aspects of the control system 560. For example, the brain box may provide real time bursts of data to the operational components 540a-n, with each of the real time bursts comprising a set of one or more control commands that dictate, inter alia, the parameters of motion (if any) for each of one or more of the operational components 540a-n. In some implementations, the robot control system 560 may perform one or more aspects of processes 300 and/or 400 described herein. As described herein, in some implementations all or aspects of the control commands generated by control system 560 can position limb(s) of robot 525 for robotic locomotion tasks. Although control system 560 is illustrated in FIG. 5 as an integral part of robot 525, in some implementations, all or aspects of the control system 560 may be implemented in a component that is separate from, but in communication with robot 525. For example, all or aspects of control system 560 may be implemented on one or more computing devices that are in wired and/or wireless communication with the robot 525, such as computing device 610.

Figure 6:
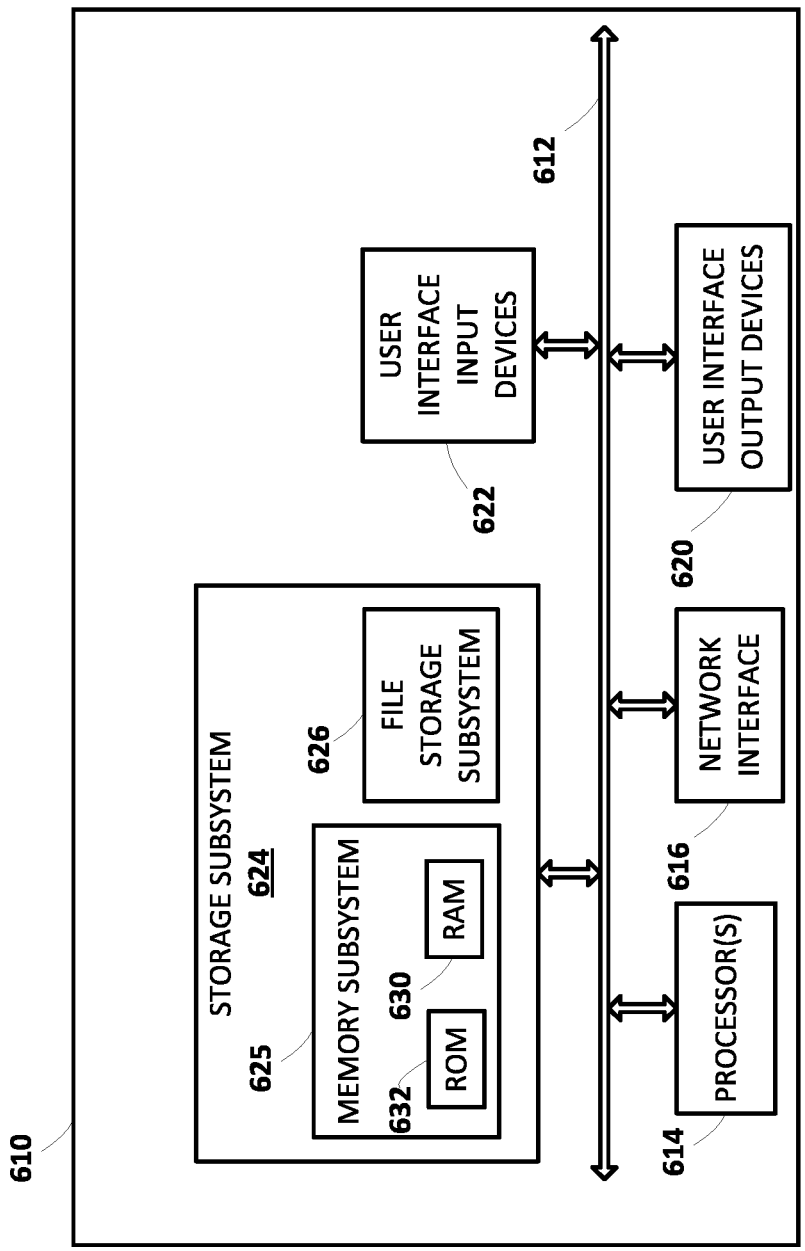
FIG. 6 schematically depicts an example architecture of a computing system.

FIG. 6 is a block diagram of an example computing device 610 that may optionally be utilized to perform one or more aspects of techniques described herein. For example, in some implementations computing device 610 may be utilized to provide desired locomotion by robot 202, robot 525 and/or other robots. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the process of FIGS. 3 and/or 4.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including an embedded computing system, workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is provided, the method includes determining a pose of a mobile robot within a real world training workspace. The method further includes selecting, from a plurality of disparate policy networks each being for a corresponding component of locomotion, a corresponding policy network, wherein selecting the corresponding policy network is based on comparing the pose to at least one parameter of the real world training workspace. For each of a plurality of iterations, and until one or more conditions are satisfied, the method further includes determining current state data of the mobile robot, using the selected policy network and the corresponding current state data to determine one or more corresponding actions, and storing a corresponding training instance in association with the selected corresponding policy network, the corresponding training instance including at least the corresponding current state data and the one or more corresponding actions. The method further includes implementing the one or more corresponding actions at the mobile robot.

These and other implementations of the technology disclosed herein can include one or more of the following features.

In some implementations, the at least one parameter of the real world training workspace is a position of a landmark within the real world training workspace, and wherein selecting the corresponding policy network includes selecting the corresponding policy network based on comparing the pose to the position of the landmark within the real world training workspace. In some versions of those implementations, selecting the corresponding policy network based on comparing the pose to the position of the landmark within the real world training workspace includes dividing the real world workspace into a plurality of sectors, wherein each sector corresponds to a distinct policy network in the plurality of disparate policy networks. In some versions of those implementations, the method further includes determining the sector, of the plurality of sectors, corresponding to the position of the landmark. In some versions of those implementations, the method further includes selecting the corresponding policy network based on the determined sector. In some versions of those implementations, the location of the landmark is the center of the real world workspace, and wherein the plurality of sectors are based on the relative pose of the robot within the real world workspace.

In some implementations, the method further includes updating one or more portions of the selected policy network using the training instances stored in association with the selected policy network in the iterations. In some versions of those implementations, at least some of the updating occurs prior to cessation of the plurality of iterations. In some versions of those implementations, after cessation of the plurality of iterations, the method further includes determining an additional pose of the mobile robot within the real world training workspace. The method further includes selecting, from the plurality of disparate policy networks, an additional policy network, wherein selecting the additional policy network is based on comparing the additional pose to the at least one parameter of the real world training workspace. For each of a plurality of additional iterations, and until the one or more conditions are satisfied, the method further includes determining additional current state data of the mobile robot, using the selected additional policy network and the corresponding additional current state data to generate one or more corresponding additional actions, and storing an additional corresponding training instance in association with the selected corresponding additional policy network, the corresponding additional training instance including at least the corresponding additional current state data and the one or more corresponding additional actions. The method further includes implementing the one or more corresponding additional actions at the mobile robot. The method further includes updating one or more portions of the selected additional policy network using the additional training instances stored in association with the selected additional policy network in the additional iterations. In some versions of those implementations, the corresponding component of locomotion, for the policy network, is a forward movement component, and wherein the corresponding component of locomotion, for the additional policy network, is one of: a backwards movement component, a left movement component, and a right movement component. In some versions of those implementations, determining the additional pose is performed immediately following the cessation of the additional iterations, and wherein the additional pose of the mobile robot is a direct result of implementing the one or more corresponding actions. In some versions of those implementations, determining the additional pose is performed immediately following after performing an automated recovery of the robot in response to a fall of the robot that led to the cessation of the additional iterations, and wherein the additional pose of the mobile robot is a direct result of implementing the automated recovery of the robot.

In some implementations, updating one or more portions of the selected policy network using the training instances stored in association with the selected policy network in the iterations includes generating a reward based on the training instances. In some implementations, the method further includes updating one or more portions of the selected policy network based on the determined reward.

In some implementations, determining the pose of the mobile robot within the real world training workspace includes determining the pose of the mobile robot within the real world workspace based on one or more instances of sensor data captured via one or more sensors. In some versions of those implementations, the one or more instances of sensor data include one or more instances of vision data captured via one or more vision sensors mounted overhead the workspace, and wherein determining the pose of the robot within the real world workspace comprises determining the pose of the mobile robot based on the one or more instances of vision data. In some versions of those implementations, the one or more instances of sensor data include one or more instances of signal strength data transmitted via one or more wireless signal transmitters placed in the real world workspace and captured via one or more receivers of the mobile robot, and wherein determining the pose of the mobile robot within the real world workspace includes determining the pose of the mobile robot based on the one or more instances of signal strength data.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the methods described herein. Some implementations also include one or more transitory or non-transitory computer readable storage media storing computer instructions executable by one or more processors to perform any of the methods described herein.

We claim:

1. A method implemented by one or more processors, the method comprising:
   determining a pose of a mobile robot within a real world training workspace;
   selecting, from a plurality of disparate policy networks each being for a corresponding component of locomotion, a corresponding policy network, wherein selecting the corresponding policy network is based on comparing the pose to a position of a center of the real world training workspace to determine the corresponding policy network with the corresponding component of locomotion that will move the mobile robot towards the center of the real world training workspace; and for each of a plurality of iterations, and until one or more conditions are satisfied:
- determining current state data of the mobile robot,
- using the selected policy network and the corresponding current state data to determine one or more corresponding actions to move the mobile robot towards the center of the real world training workspace,
- storing a corresponding training instance in association with the selected corresponding policy network, the corresponding training instance including at least the corresponding current state data and the one or more corresponding actions, and
- implementing the one or more corresponding actions at the mobile robot;

updating one or more portions of the selected policy network using the training instances stored in association with the selected policy network in the iterations;

after cessation of the plurality of iterations:
- determining an additional pose of the mobile robot within the real world training workspace, wherein the additional pose is distinct from the pose of the mobile robot, and wherein the additional pose of the mobile robot corresponds with an additional component of locomotion distinct from the component of locomotion of the pose of the mobile robot;
- selecting, from the plurality of disparate policy networks, an additional policy network corresponding to the additional component of locomotion,
  - wherein selecting the additional policy network is based on comparing the additional pose to the center of the real world training workspace with the corresponding additional component of locomotion that will move the mobile robot towards the center of the real world training workspace,
  - wherein the additional policy network is distinct from the policy network, and
  - wherein the additional component of locomotion corresponding to the additional policy network is distinct from the component of locomotion corresponding to the policy network;
- for each of a plurality of additional iterations, and until the one or more conditions are satisfied:
  - determining additional current state data of the mobile robot,
  - using the selected additional policy network and the corresponding additional current state data to generate one or more corresponding additional actions to move the mobile robot towards the center of the real world training workspace,
  - storing an additional corresponding training instance in association with the selected corresponding additional policy network, the corresponding additional training instance including at least the corresponding additional current state data and the one or more corresponding additional actions, and
  - implementing the one or more corresponding additional actions at the mobile robot; and
- updating one or more portions of the selected additional policy network using the additional training instances stored in association with the selected additional policy network in the additional iterations.

2. The method of claim 1, wherein selecting the corresponding policy network based on comparing the pose to the position of the center of the real world training workspace comprises:
- dividing the real world workspace into a plurality of sectors, wherein each sector corresponds to a distinct policy network in the plurality of disparate policy networks;
- determining the sector, of the plurality of sectors, corresponding to the position of the center of the real world training workspace; and
- selecting the corresponding policy network based on the determined sector.

3. The method of claim 2, wherein the plurality of sectors are based on the relative pose of the robot within the real world workspace.

4. The method of claim 1, wherein at least some of the updating occurs prior to cessation of the plurality of iterations.

5. The method of claim 1, wherein the corresponding component of locomotion, for the policy network, is a forward movement component, and wherein the corresponding component of locomotion, for the additional policy network, is one of: a backwards movement component, a left movement component, and a right movement component.

6. The method of claim 1, wherein determining the additional pose is performed immediately following the cessation of the additional iterations, and wherein the additional pose of the mobile robot is a direct result of implementing the one or more corresponding actions.

7. The method of claim 1, wherein determining the additional pose is performed immediately following after performing an automated recovery of the robot in response to a fall of the robot that led to the cessation of the additional iterations, and wherein the additional pose of the mobile robot is a direct result of implementing the automated recovery of the robot.

8. The method of claim 1, wherein updating one or more portions of the selected policy network using the training instances stored in association with the selected policy network in the iterations comprises:
- generating a reward based on the training instances; and
- updating one or more portions of the selected policy network based on the determined reward.

9. The method of claim 1, wherein determining the pose of the mobile robot within the real world training workspace comprises:
- determining the pose of the mobile robot within the real world workspace based on one or more instances of sensor data captured via one or more sensors.

10. The method of claim 9, wherein the one or more instances of sensor data include one or more instances of vision data captured via one or more vision sensors mounted overhead the workspace, and wherein determining the pose of the robot within the real world workspace comprises determining the pose of the mobile robot based on the one or more instances of vision data.

11. The method of claim 9, wherein the one or more instances of sensor data include one or more instances of signal strength data transmitted via one or more wireless signal transmitters placed in the real world workspace and captured via one or more receivers of the mobile robot, and wherein determining the pose of the mobile robot within the real world workspace comprises determining the pose of the mobile robot based on the one or more instances of signal strength data.

12. A system comprising:
one or more processors; and
memory storing instructions that, when executed by the one or more processors, cause the one or more processors to perform operations that include:
  determining a pose of a mobile robot within a real world training workspace;
  selecting, from a plurality of disparate policy networks each being for a corresponding component of locomotion, a corresponding policy network, wherein selecting the corresponding policy network is based on comparing the pose to a position of a center of the real world training workspace to determine the corresponding policy network with the corresponding component of locomotion that will move the mobile robot towards the center of the real world training workspace; and
  for each of a plurality of iterations, and until one or more conditions are satisfied:
    determining current state data of the mobile robot,
    using the selected policy network and the corresponding current state data to determine one or more corresponding actions to move the mobile robot towards the center of the real world training workspace,
    storing a corresponding training instance in association with the selected corresponding policy network, the corresponding training instance including at least the corresponding current state data and the one or more corresponding actions, and
    implementing the one or more corresponding actions at the mobile robot;
    updating one or more portions of the selected policy network using the training instances stored in association with the selected policy network in the iterations;
  after cessation of the plurality of iterations:
    determining an additional pose of the mobile robot within the real world training workspace, wherein the additional pose is distinct from the pose of the mobile robot, and wherein the additional pose of the mobile robot corresponds with an additional component of locomotion distinct from the component of locomotion of the pose of the mobile robot;
    selecting, from the plurality of disparate policy networks, an additional policy network corresponding to the additional component of locomotion,
      wherein selecting the additional policy network is based on comparing the additional pose to the center of the real world training workspace with the corresponding additional component of locomotion that will move the mobile robot towards the center of the real world training workspace,
      wherein the additional policy network is distinct from the policy network, and
      wherein the additional component of locomotion corresponding to the additional policy network is distinct from the component of locomotion corresponding to the policy network;
    for each of a plurality of additional iterations, and until the one or more conditions are satisfied:
      determining additional current state data of the mobile robot,
      using the selected additional policy network and the corresponding additional current state data to generate one or more corresponding additional actions to move the mobile robot towards the center of the real world training workspace,
      storing an additional corresponding training instance in association with the selected corresponding additional policy network, the corresponding additional training instance including at least the corresponding additional current state data and the one or more corresponding additional actions, and
      implementing the one or more corresponding additional actions at the mobile robot; and
      updating one or more portions of the selected additional policy network using the additional training instances stored in association with the selected additional policy network in the additional iterations.

13. The system of claim 12, wherein selecting the corresponding policy network based on comparing the pose to the position of the center of the real world training workspace comprises:
  dividing the real world workspace into a plurality of sectors, wherein each sector corresponds to a distinct policy network in the plurality of disparate policy networks;
  determining the sector, of the plurality of sectors, corresponding to the position of the center of the real world training workspace; and
  selecting the corresponding policy network based on the determined sector.

14. The system of claim 13, wherein the plurality of sectors are based on the relative pose of the robot within the real world workspace.

15. The system of claim 12, wherein at least some of the updating occurs prior to cessation of the plurality of iterations.

16. The system of claim 12, wherein the corresponding component of locomotion, for the policy network, is a forward movement component, and wherein the corresponding component of locomotion, for the additional policy network, is one of: a backwards movement component, a left movement component, and a right movement component.

17. The system of claim 12, wherein determining the additional pose is performed immediately following the cessation of the additional iterations, and wherein the additional pose of the mobile robot is a direct result of implementing the one or more corresponding actions.

* * * * *